(12) United States Patent
Rick et al.

(10) Patent No.: US 7,688,882 B2
(45) Date of Patent: Mar. 30, 2010

(54) TIME-TRACKING FOR CLUSTERED DEMODULATION ELEMENTS IN A SPREAD SPECTRUM SYSTEM

(75) Inventors: Roland R. Rick, Superior, CO (US);
Shimman Patel, San Diego, CA (US);
Keith Saints, San Diego, CA (US);
Haitao Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/839,504

(22) Filed: Aug. 15, 2007

(65) Prior Publication Data

US 2008/0260005 A1    Oct. 23, 2008

Related U.S. Application Data

(63) Continuation of application No. 09/968,399, filed on Sep. 28, 2001, now Pat. No. 7,277,471.

(60) Provisional application No. 60/261,402, filed on Jan. 11, 2001.

(51) Int. Cl.
*H04B 1/00* (2006.01)
(52) U.S. Cl. .................. 375/148; 375/144; 375/147; 375/326; 375/346; 375/350
(58) Field of Classification Search .......... 375/316, 375/144, 147, 148, 346, 326, 350
See application file for complete search history.

(56) References Cited

U.S. PATENT DOCUMENTS

| | | | |
|---|---|---|---|
| 5,490,165 A * | 2/1996 | Blakeney et al. ............ 370/335 |
| 5,764,687 A | 6/1998 | Easton | |
| 6,078,611 A | 6/2000 | La Rosa et al. | |
| 6,236,365 B1 * | 5/2001 | LeBlanc et al. ............. 342/457 |
| 6,345,078 B1 | 2/2002 | Basso | |
| 6,625,197 B1 | 9/2003 | Lundby et al. | |
| 6,731,676 B2 | 5/2004 | Rick et al. | |
| 6,873,667 B2 | 3/2005 | Papasakellariou et al. | |

FOREIGN PATENT DOCUMENTS

EP    0896438    2/1999

OTHER PUBLICATIONS

International Preliminary Examination Report - PCT/US02/00681 - IPEA/US - Jun. 10, 2003.
International Search Report - PCT/US02/000681 - ISA - EPO - Oct. 4, 2002.

* cited by examiner

*Primary Examiner*—Ted M Wang
(74) *Attorney, Agent, or Firm*—Bruce Greenhaus; Sayed H. Beladi

(57) ABSTRACT

An apparatus, such as a subscriber unit or a base station within a spread spectrum communication system, provides advanced control over the time-tracking of demodulation elements when unresolvable multipath situations arise. The apparatus provides merge protection that prevents clustered demodulation elements from contracting beyond a minimum time span. In addition, the apparatus provides a master/slave feature for synchronizing the time-tracking of the demodulation elements when clustered around a multipath signal.

19 Claims, 11 Drawing Sheets

TIME-TRACKING FOR CLUSTERED DEMODULATION ELEMENTS IN A SPREAD SPECTRUM SYSTEM

RELATED APPLICATIONS

This application is a Continuation of U.S. Ser. No. 09/968,399 entitled "TIME-TRACKING FOR CLUSTERED DEMODULATION ELEMENTS IN A SPREAD SPECTRUM SYSTEM, filed Sep. 28, 2001, pending, which claims priority to U.S. Provisional Application Ser. No. 60/261,402, entitled "SYSTEM STUDY: RECEIVER STRUCTURES IN FADING CHANNELS WITH NON-NEGLIGIBLE MULTIPATH SPACING: THE "FAT-PATH" CONCEPT," filed Jan. 11, 2001, both of which are hereby expressly incorporated by reference herein.

TECHNICAL FIELD

The invention relates generally to wireless communication systems and, more particularly, to demodulating spread spectrum signals.

BACKGROUND

A number of conventional wireless communication techniques have been developed. One common technique is code division multiple access (CDMA) in which multiple communications are simultaneously conducted over a radio-frequency (RF) spectrum. Example wireless communication devices ("subscriber units") that have incorporated CDMA technology include cellular radiotelephones, satellite radiotelephones, PCMCIA cards for portable computers, personal digital assistants (PDAs) equipped with wireless communication capabilities, and the like.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), and (5) some other standards. A system that implements the High Rate Packet Data specification of the CDMA2000 standard is referred to herein as a high data rate (HDR) system. The HDR system is documented in TIA/EIA-IS-856, "CDMA2000 High Rate Packet Data Air Interface Specification." Proposed wireless systems also provide a combination of HDR and low data rate services (such as voice and fax services) using a common air interface.

A typical CDMA communication system includes a number of mobile subscriber units that encode voice and data in CDMA waveforms. The subscriber units communicate with base stations, also referred to as base transceiver subsystems (BTS), cell stations, cell sites, or simply cells. A base station demodulates incoming CDMA waveforms received from subscriber units within a limited geographic region, and transmits outgoing CDMA waveforms to the subscriber units. A base station controller (BSC) provides an interface between the base stations and the public switched telephone network (PSTN) for routing the signals to other remote base stations or to any conventional telephony system. In general, transmission from the base station to the subscriber unit is referred to as the Forward CDMA Channel, and is sometimes called a downlink. Transmission from the subscriber unit to the base station is referred to as the Reverse CDMA Channel, and is sometimes called an uplink.

At any given moment, a single subscriber unit or base station may receive multiple replicas of the transmit signal, each replica possibly having a different amplitude, phase and time delay. The replicas are often caused by reflections of the transmit signal off of obstacles in the environment, such as buildings, trees, cars and people. The various replicas of the transmit signal are referred to as "paths," with the general characteristic referred to as "multipath."

The transmit signal of a CDMA communication system consists of a train of pulses called "chips." More specifically, a transmitter generates a spread spectrum transmit signal by modulating an outbound serial stream of data with a pseudonoise (PN) code. The application of the PN code to the data produces a stream of chips. The resulting chips are transmitted according to some modulation scheme, such as quadrature phase shift keying (QPSK) modulation. In order to separate signals from multiple users, the receivers isolate the signal of the desired user by matching the signal to the corresponding PN code.

The rate that the PN code is applied is referred to as the chip rate, which is typically many times faster than the data rate. The duration of one pulse of the PN code is often used as a unit of measure referred to as chip time. The time delay between multiple received paths is often represented in chip time. A time delay of 1.5 chips between two paths, for example, indicates a time delay equal to 1.5 times the chip time of the transmit signal.

In order to reduce effects of signal fading and for other advantages, conventional CDMA receivers discriminate between multiple paths during demodulation. In particular, a typical CDMA receiver, commonly referred to as a RAKE receiver, contains a number of demodulation elements. When the paths have a time separation greater than a threshold, such as approximately 1.5 chips or more, the receiver typically assigns the demodulation elements time offsets corresponding to the different paths. For shorter time separations, often referred to as "unresolvable multipath spacing," conventional receivers typically do not assign multiple demodulation elements because the multiple paths often appear as a single mass of energy without readily detectable peaks. Similarly, if multiple paths shift from greater time separations to unresolvable multipath, the demodulation elements often converge to have the same time offset. When two demodulations elements have "merged" as such, conventional receivers typically deassign one of the demodulation elements.

SUMMARY

In general, the invention is directed to time-tracking techniques to achieve improved performance in unresolvable multipath environments or hybrid resolvable/unresolvable multipath environments. In particular, the techniques finely control time-tracking for demodulation elements within a receiver. The techniques may be particularly useful when controlling time-tracking of demodulation elements clustered around a "short" multipath signal in which the paths have a time separation ranging between 0.25 chips and 1.5 chips.

The receiver includes merge protection that prevents clustered demodulation elements from converging to less than a threshold time separation. Time-tracking commands that would otherwise cause demodulation elements to have a time separation below the threshold are intercepted and filtered. In this manner, the merge protection time-tracking feature allows clusters of demodulation elements to track one or more paths in unresolvable multipath environments without merging and being deassigned. Among other advantages, merge protection prevents the demodulation elements from contracting below a minimum time span. By ensuring a minimum time span, merge protection allows the demodulation elements to adaptively adjust and maintain a total time span so as to contain substantially all of the energy of the received spread spectrum signal.

The receiver also supports a master/slave (M/S) technique for controlling the time-tracking of clustered demodulation elements. When enabled, the M/S time-tracking technique synchronizes time-tracking adjustments to slave demodulation elements with time-tracking adjustments to a master demodulation element. In this manner, the clustered demodulation elements can surround and track an unresolvable multipath in unison.

These features may be selectively enabled for independent use, or may be used in conjunction to further improve performance. Consequently, the receiver can achieve significant improvements in unresolvable multipath environments, including improved signal to noise ratio, power control and capacity. The techniques may be advantageous in multipath environments in which multiple paths exist but have a small time separation such that the individual signal peaks are not readily detectable, such as a time separation of less than 1.5-2.0 chips. Furthermore, the techniques may be particularly advantageous for environments in which the time separation is between, for example, 0.25 chips and 2.0 chips.

In one embodiment, the invention is directed to an apparatus for use in a spread spectrum system, such as within a subscriber unit or base station. The apparatus comprises a plurality of demodulation elements that demodulate a spread spectrum signal. Each demodulation element has a corresponding time offset. A time-tracking module issues a time tracking command to adjust the time offset of a target demodulation element. A cluster controller intercepts the time tracking commands and, based on a time separation between the target demodulation element and another one of the demodulation elements, selectively sets an output to adjust the time offset of the target demodulation element. The cluster controller may, for example, filter the command when application of the command would cause the time separation to decrease below a threshold.

In another embodiment, the time-tracking module issues the time-tracking command to adjust the time offset of a target demodulation element, and the cluster controller forwards the command to the target demodulation element and at least one other demodulation element. The cluster controller maintains a data structure to store data that designates the demodulation elements as master demodulation elements and slave demodulation elements. In this manner, the cluster controller forwards the command to the target demodulation element and any other demodulation elements that are designated as slaves to the target demodulation element.

In another embodiment, the invention is directed to a method for adjusting the time-tracking of the demodulation elements. The method involves intercepting a time-tracking command for adjusting a time offset of a target demodulation element. Slave demodulation elements assigned to the target demodulation element are identified. The method further involves determining whether application of the time tracking command to the target demodulation element and the slave demodulation elements would decrease any time separation for the demodulation elements below a threshold. Based on the determination, the time offsets of the target demodulation element may be adjusted.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
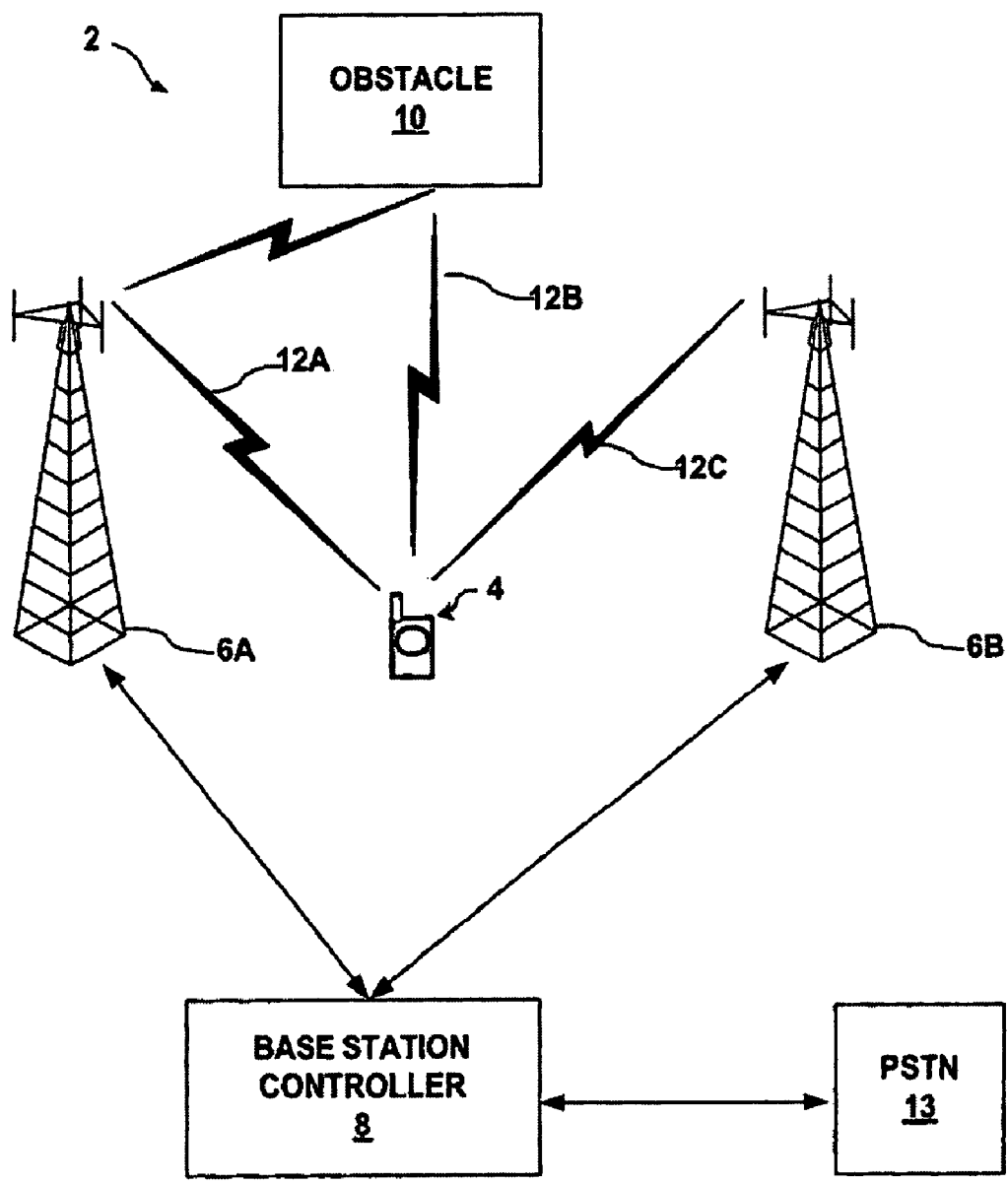
FIG. 1 is a block diagram illustrating an exemplary spread spectrum telecommunication system.

FIG. 1 is a block diagram illustrating a spread spectrum telecommunication system 2 in which subscriber unit 4 receives a number of spread spectrum signals 12, also referred to herein as "paths." In particular, subscriber unit 4 receives signal 12A from base station 6A, as well as signal 12B caused by reflection of signal 12A from obstacle 10. In addition, subscriber unit 4 receives a spread spectrum signal 12C from base station 6B. Obstacle 10 may be any structure proximate subscriber unit 4 such as a building, bridge, car or even a person. Examples of subscriber unit 4 include a cellular radiotelephone, a satellite radiotelephone, a PCMCIA card incorporated within a computer, a personal digital assistant (PDA) equipped with wireless communication capabilities, and the like. Base station controller (BSC) 8 provides an interface between base stations 6 and the public switched telephone network (PSTN) 13. In this manner, BSC 8 may route calls between subscriber units 4 and other remote base stations or a conventional telephony system connected to PSTN 13.

Signal 12A and signal 12B illustrate a multipath environment in which multiple receive signals carry the same information, but may have different amplitudes, phases and time delays. Subscriber unit 4 discriminates between signals 12A and 12B, as well as signal 12C, during demodulation. As described in detail below, subscriber unit 4 contains a number of demodulation elements (not shown), and assigns the demodulation elements to track different received signals 12. In particular, subscriber unit 4 sets a time offset within each of the demodulation elements according to the time delay of the respective signal 12 being tracked.

As described in detail herein, subscriber unit 4 employs a number of time-tracking techniques to achieve improved performance in unresolvable multipath environments. Subscriber unit 4 includes, for example, a merge protection feature that prevents elements tracking paths from the same base station 6 from converging to less than a threshold time separation. In one embodiment, commands issued by a time-tracking module to adjust the time offsets of the demodulation elements are intercepted. Commands are filtered that would otherwise result in demodulation elements tracking the same base station to have a time separation below the threshold. Consequently, merge protection can be viewed as an override mechanism that prevents any two demodulation elements from moving closer than a certain distance in time from one another. In this manner, the merge protection time-tracking feature of subscriber unit 4 allows clusters of demodulation elements to track one or more paths in unresolvable multipath environments.

Among other advantages, the merge protection feature prevents the demodulation elements of subscriber unit 4 from contracting below a minimum time span. When unresolvable multipath conditions arise, the demodulation elements of conventional receivers tend to time track to a center time offset, resulting in a contraction of the total time span covered by the demodulation elements. By ensuring a minimum time span, the merge protection feature allows the demodulation elements of subscriber unit 4 to adaptively adjust and maintain the time span and location of the demodulation elements so as to contain substantially all of the energy of the received spread spectrum signal.

In addition, subscriber unit 4 can control the time-tracking of clustered demodulation elements using a master/slave (M/S) technique. When enabled, the M/S time-tracking technique synchronizes time-tracking adjustments to slave demodulation elements with time-tracking adjustments to a master demodulation element. In this manner, the clustered demodulation elements can surround and track an unresolvable multipath in unison.

These features may be selectively enabled for independent use, or may be used in conjunction to further improve performance. Consequently, subscriber unit 4 can achieve significant improvements in unresolvable multipath environments, including improved signal to noise ratio, power control and capacity. The techniques may be advantageous in multipath environments in which multiple paths exist but have a small time separation, e.g., less than 1.5 to 2.0 chips, such that the signal peaks are not readily detectable. Furthermore, the techniques may be particularly advantageous for environments in which the time separation is between, for example, 0.25 chips and 2.0 chips.

Figure 2:
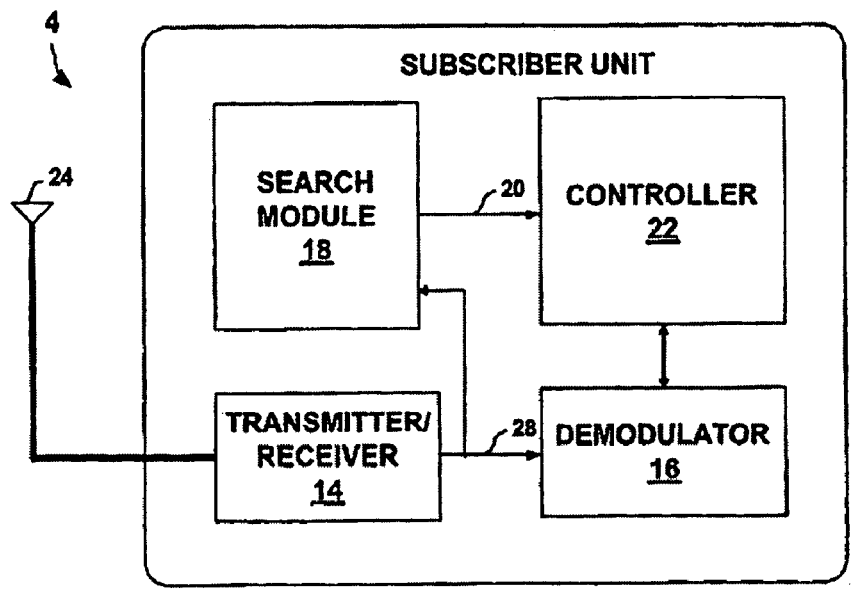
FIG. 2 is a block diagram illustrating an exemplary subscriber unit that controls time-tracking for clustered demodulation elements according to the principles of the invention.

FIG. 2 is a block diagram illustrating an example subscriber unit 4 that manages clusters of demodulation elements according to the principles of the invention. Subscriber unit 4 includes radio frequency transmitter/receiver 14, demodulator 16, search module 18, controller 22, and radio-frequency antenna 24. Non-limiting examples of subscriber unit 4 include a cellular radiotelephone, satellite radiotelephone, a PCMCIA card incorporated within a computer, a PDA equipped with wireless communication capabilities, and the like. Furthermore, the techniques described in reference to subscriber 4 may readily be implemented within other components of a spread spectrum wireless system, such as a base station operating in a receive mode.

Subscriber unit 4 may be designed to support one or more CDMA standards and/or designs, e.g., the W-CDMA standard, the IS-95 standard, the CDMA2000 standard, and the HDR specification. Accordingly, antenna 24 receives incoming RF signals, such as CDMA modulated signals transmitted from a CDMA base station. Transmitter/receiver 14 includes circuitry to process the received RF signal and output baseband samples. Transmitter/receiver 14 may process the received signal through a low-noise amplifier (LNA), an RF mixer and an analog-to-digital (A/D) converter to produce corresponding digital values of the received signal, e.g., a digital baseband signal 28.

To properly demodulate incoming spread spectrum signals, subscriber unit 4 must align its PN sequences to those of the transmitting base station. For example, in IS-95, each base station and subscriber unit uses the same PN sequences. Base stations 6 are distinguished by unique time offsets in the generation of their PN sequences. In particular, each demodulation element within demodulator 16 must insert the appropriate code phase offset into its PN sequence in order to properly demodulate signals from a base station. Search module 18 continually scans for signals received from nearby base stations.

Search module 18 continually scans an incoming spread spectrum signal 28 in the time domain to determine the existence, time offset, and signal strength of received paths. Search module 18 records and reports the path information as search results 20. Local maximum energy peaks, representing received paths, appear for time offsets that result in recovery of a received signal, while other time offsets typically result in little or no signal energy. The signal energy level may be expressed as a relative value, e.g., a scaled integer having a value between 0 and 65535. In a multipath environment, signal reflections or echoes may cause multiple energy peaks to occur.

Controller 22 uses search results 20 received from search module 18 to assign demodulation elements (not shown) of demodulator 16 for tracking and demodulating one or more of the signal paths detected within baseband signal 28. In particular, controller 22 assembles a list of potential signal paths based on search results 20 including the time delay (offset) and a signal strength for each candidate path. Controller 22 then merges time offsets and signal strengths reported by demodulation elements of demodulator 16 to form an aggregate list for use in assigning demodulation elements.

Demodulator 16, as described in detail below, finely controls the timing of "clustered" demodulation elements to achieve improved performance in unresolvable multipath environments. Specifically, demodulator 16 includes merge protection that prevents demodulation elements that are tracking paths from the same base station from contracting below a minimum time span. In addition, demodulator 16 can control the demodulation elements using master/slave techniques in which time-tracking adjustments to slave demodulation elements are synchronized with time-tracking adjustments to a master demodulation element.

Figure 3:
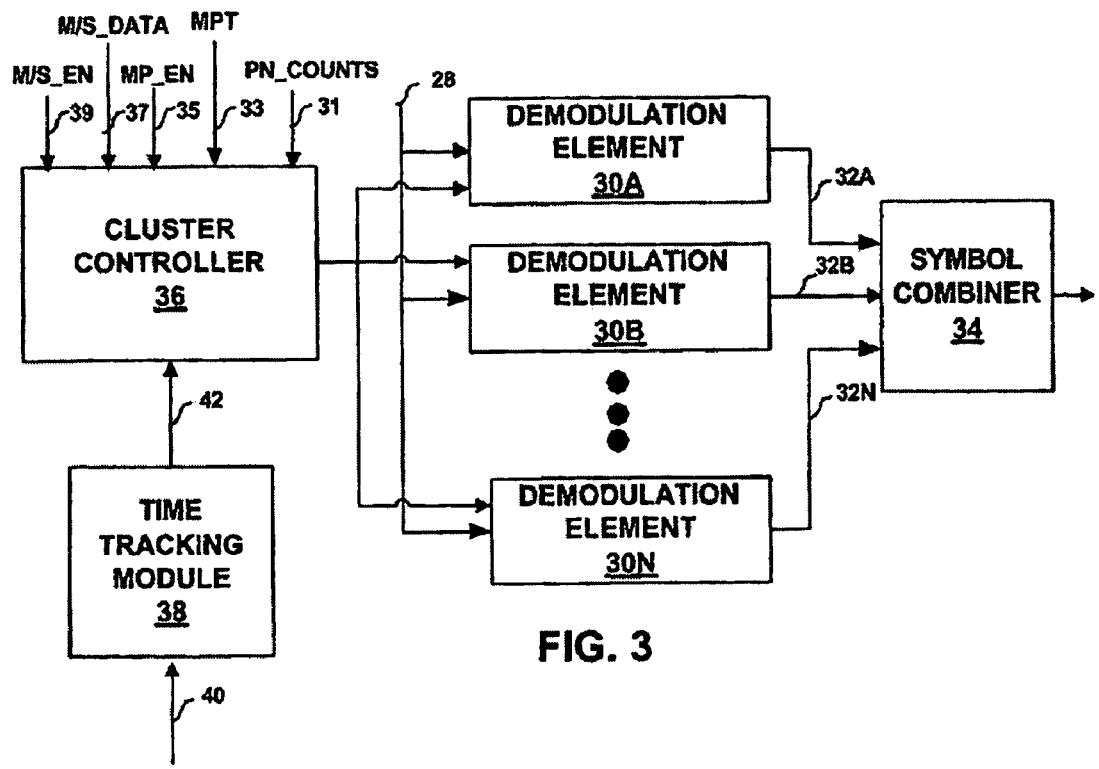
FIG. 3 is a block diagram illustrating a portion of a demodulator for use in the subscriber unit.

FIG. 3 is a block diagram illustrating a portion of demodulator 16 in further detail. Demodulator 16 includes N demodulation elements 30A-30N, referred to collectively as demodulation elements 30, that receive and demodulate digital baseband signal 28. In particular, demodulation elements 30 process digital baseband signal 28 to produce soft data bits 32A-32N, collectively referred to as soft data bits 32. Symbol combiner 34 receives and combines soft data bits 32 to produce aggregate data for decoding into symbol information.

For CDMA systems, for example, each of demodulation elements 30 includes a despreader and sequence generator that generates PN sequences according to a time offset supplied by time-tracking module 38. Consequently, the PN sequences used by the various demodulation elements 30 may be identical to those used by the transmitting base station being tracked by the respective demodulation element 30. Each demodulation element 30 may also include a number of components (not shown) for use in tracking and demodulating the assigned paths including filters, scaling and phase rotation circuitry, digital mixers and a Walsh sequence generator.

By providing time offsets based on the search results received from search module 18 (FIG. 2), controller 22 assigns each of demodulation elements 30 to track and demodulate one of the plurality of received paths. More specifically, time-tracking module receives path assignment information 40 from controller 22 and configures the demodulation elements 30 to track paths according to a specified time offset. Controller 22 may periodically reassign the demodulation elements 30, such as every 40 milliseconds (ms). At a much higher frequency, such as every 50 microseconds (µs), time-tracking module 38 issues time-tracking commands 42 to finely adjust the time offsets of demodulation elements 30.

Time-tracking module 38 may issue time-tracking commands 42 based on energy estimates received from the individual demodulation elements 30. Time-tracking commands 42 may direct one or more demodulation elements 30 to advance or retard their corresponding time offsets. An advance command may increment a PN counter by a fractional chip resolution, while a retard command may decrement the PN counter or may freeze the PN counter for one clock cycle. Time-tracking module 38 may take the form of dedicated hardware circuitry, or may comprise one or more digital signal processors (DSPs). In some embodiments, time-tracking commands 42 may take the form of strobes on individual advance or retard output signals.

Cluster controller 36 provides for finely controlled timing of clustered demodulation elements to achieve improved performance in unresolvable multipath environments. Cluster controller 36 provides advanced control over the time-tracking and time separations for any of demodulation elements 30 that are clustered together, such as when tracking unresolvable multipath signals. Specifically, cluster controller 36 provides merge protection that prevents demodulation elements 30 that are tracking paths from the same base station from contracting beyond a minimum time span. In addition, cluster controller 36 provides a master/slave feature for synchronizing the time-tracking of demodulation elements 30 when clustered around a multipath signal. The time-tracking features of controller 36 may be selectively enabled for independent use, or may be used in conjunction to further improve performance.

To support the features, cluster controller 36 receives configuration information directly from controller 22 (FIG. 2). Specifically, to support merge protection, controller 22 controls MP_EN input 35 to enable and disable merge protection for pairwise combinations of demodulation elements 30. In this manner, controller 22 can selectively enable merge protection for pairs of demodulation elements 30. Merge Protection Threshold (MPT) 33 specifies the minimum distance in time to be maintained between any two of demodulation elements 30. A typical threshold time separation may fall within a range of ⅝ths to 1.0 of a chip time. An appropriate threshold in some embodiments may be on the order of ⅞ths of a chip time. PN_COUNTS 31 specifies in fractional chip resolution the current PN counts for each of the N demodulation elements 30.

For master/slave time-tracking, controller 22 controls M/S_EN 39 to enable and disable the master/slave time-tracking capabilities of cluster controller 36. In addition, controller 22 sets M/S_DATA 37 to specify whether each of demodulation elements 30 is to be treated as a master or a slave. For a subscriber unit 4 having N demodulation elements 30, M/S_DATA 37 may be, for example, an array of N elements. Each element of the array may uniquely correspond to one of the N demodulation elements 30, and may identify a master demodulation element. Default values for the array may be {1, 2, 3, . . . N} indicating each of demodulation elements 30 is its own master.

Cluster controller 36 intercepts time-tracking commands 42 from time-tracking module 38 and forwards the time-tracking commands to one or more demodulation elements 30 according to the merge protection and master/slave features. When merge protection is enabled, for example, cluster controller 36 determines whether the issuance of time-tracking command 42 would otherwise result in two or more of demodulation elements 30 moving closer than a minimum distance in time. If so, cluster controller 36 blocks the time-tracking command 42. If not, the cluster controller 36 issues the time-tracking command 42 to the appropriate one of demodulation elements 30. In this fashion, cluster controller 36 prevents the demodulation elements of subscriber unit 4 from contracting below a minimum time span, and ensures a minimum time span so as to contain substantially all of the energy of baseband signal 28, thereby improving demodulation.

When the master/slave time-tracking capabilities are enabled, cluster controller 36 determines whether the issued time-tracking command 42 is destined for a master demodulation element or a slave demodulation element. When targeted for a master demodulation element, cluster controller 36 simultaneously forwards the time-tracking command 42 to the target demodulation element as well as all demodulation elements that are slaves to the targeted master. In this manner, the time-tracking of the slave demodulation elements is synchronized with the master in that their respective offsets advance and retard along with the master demodulation element. If the time-tracking command 42 is directed to a slave demodulation element 30, cluster controller 36 filters the time-tracking command because the slave is tracking a master demodulation device.

When both merge protection and M/S time-tracking is enabled, cluster controller 36 ensures that no master demodulation element or any of its slave demodulation elements move within a minimum time separation from another demodulation element. The merge protection and M/S time-tracking features provide fine control over clusters of demodulation elements 34, and allow controller 22 to assign the demodulation elements 30 in clusters around one or more paths. In particular, the merge protection feature ensures that the total time span of the cluster is sufficient to substantially contain the energy from the paths. The master/slave time-tracking capability allows the demodulation elements of the cluster to dynamically shift around a center of the cluster in unison.

In one embodiment, cluster controller 36 includes circuitry configured as a state machine for implementing these time-tracking features. Furthermore, cluster controller 36 may include output circuitry capable of outputting an advance signal or retard signal to each demodulation element. Alternatively, these time-tracking features could be implemented in software executing on a programmable processor, such as a digital signal processor (DSP). In this manner, these features could readily be implemented within time-tracking module 38 without requiring a physically separate cluster controller 36.

Figure 4:
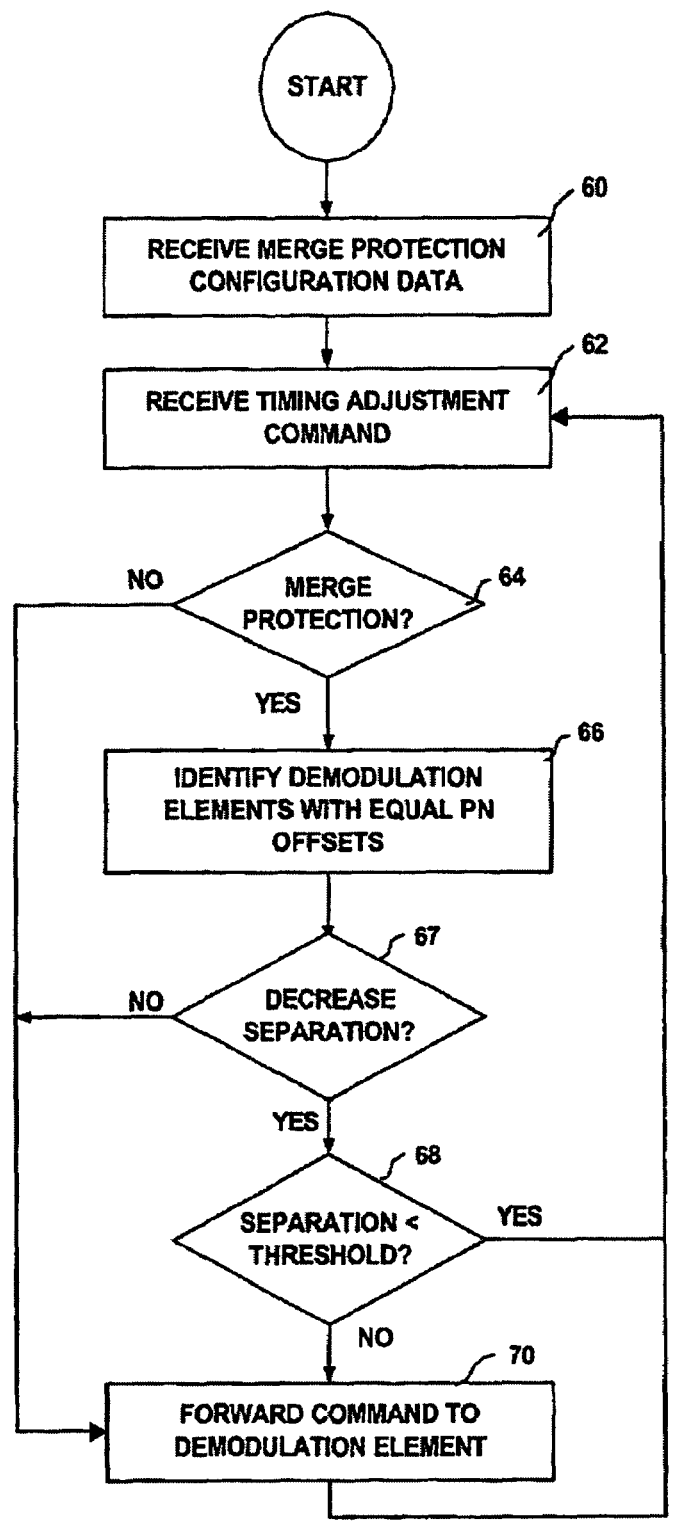
FIG. 4 is a flow chart providing a high-level overview of a merge protection time-tracking feature of the subscriber unit.

FIG. 4 is a flow chart illustrating operation of one embodiment of cluster controller 36 that supports merge protection. Initially, cluster controller 36 receives configuration information from controller 22 including MP_EN input 35, Merge Protection Threshold (MPT) 33, and PN_COUNTS 31 (60).

After configuration, cluster controller 36 continuously intercepts each timing command 42 issued by time-tracking module 38 (62). The timing command 42 may, for example, direct one of demodulation elements 30 to advance or retard its time offset. After receiving timing command 42, cluster controller 36 determines whether merge protection is enabled for the demodulation element to which the command was directed (64).

If merge protection is not enabled for the demodulation element targeted by timing command 42, cluster controller 36 forwards the command to the targeted demodulation element (70). If merge protection is enabled, cluster controller 36 identifies any of demodulation elements 30 that are currently assigned to paths originating from the same base station as the path assigned to the targeted demodulation element. In particular, cluster controller 36 identifies any of demodulation elements 30 configured to have the same PN offset as the targeted demodulation element (66). In this manner, cluster controller 36 applies merge protection to only those demodulation elements assigned to the same base station 6. Consequently, cluster controller 36 allows demodulation elements that are assigned to different base stations to have close or even identical time offsets.

Next, cluster controller 36 determines whether application of the timing command would cause any of the time separations between the targeted demodulation element and the identified demodulation elements to decrease (67) and yield a resultant time separation below the threshold specified by the MPT input (68). If not, cluster controller 36 forwards the command to the targeted demodulation element (70). In this manner, the demodulation elements are allowed to track apart when having time separations below the defined threshold. If so, cluster controller 36 filters the command and, specifically, does not issue the timing command to the targeted demodulation element. Cluster controller 36 repeats the process to intercept and potentially filter timing commands 42 issued by time-tracking module 38.

Figure 5:
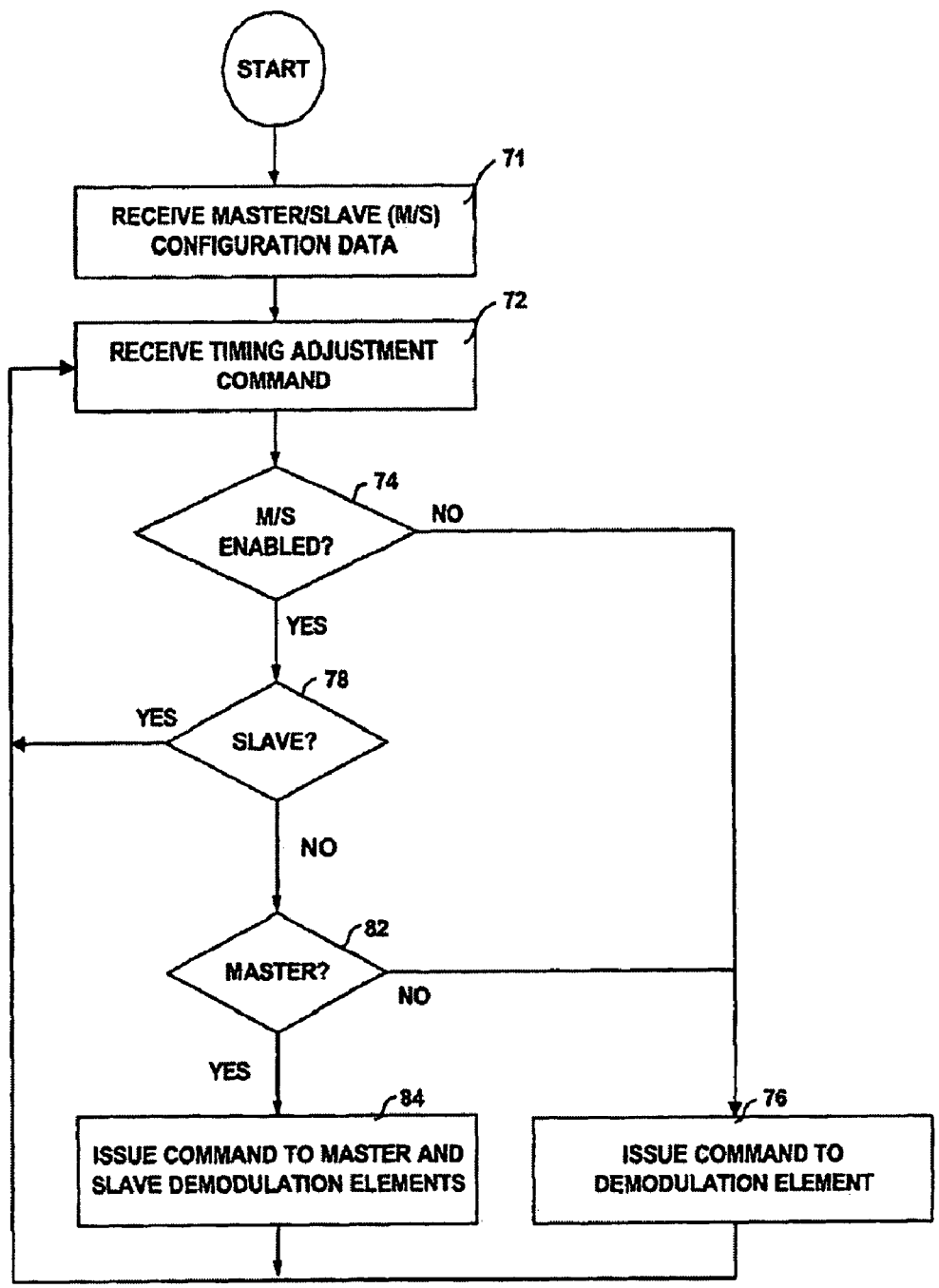
FIG. 5 is a flow chart providing a high-level overview of a master/slave time-tracking feature of the subscriber unit.

FIG. 5 is a flow chart illustrating high-level operation of one embodiment of cluster controller 36 that supports master/slave (M/S) time-tracking. Initially, cluster controller 36 receives configuration information from controller 22 including M/S_EN input 39 and M/S_DATA 37 (71).

After configuration, cluster controller 36 continuously intercepts each timing command 42 issued by time-tracking module 38 (72). As described above, each timing command 42 typically directs one of demodulation elements 30 to advance or retard its time offset. After receiving timing command 42, cluster controller 36 determines whether M/S time-tracking is enabled (74).

If M/S time-tracking is not enabled, cluster controller 36 forwards the command to the targeted demodulation element (76). If M/S time-tracking is enabled, cluster controller 36 examines M/S_DATA to determine whether the target demodulation element for timing command 42 is currently configured as a slave device (78). If so, cluster controller 36 filters the command and, specifically, does not issue the timing command to the targeted demodulation element.

If the targeted demodulation element is not currently designated as a slave, cluster controller 36 determines whether the demodulation element is designated as a master (82). If so, cluster controller 36 simultaneously forwards the time tracking command to the targeted demodulation element and all corresponding slave demodulation elements, thereby maintaining substantially constant time separations between the master demodulation element and the slave demodulation elements (84). Accordingly, slave demodulation elements do not receive their own time-tracking commands, but instead respond to commands initially targeted for a different demodulation element.

If the target is not a master device, cluster controller 36 forwards the command only to the targeted demodulation element (76). Cluster controller 36 repeats the process to intercept timing commands 42 issued by time-tracking module 38, and potentially forward them to multiple demodulation elements simultaneously.

Figure 6:
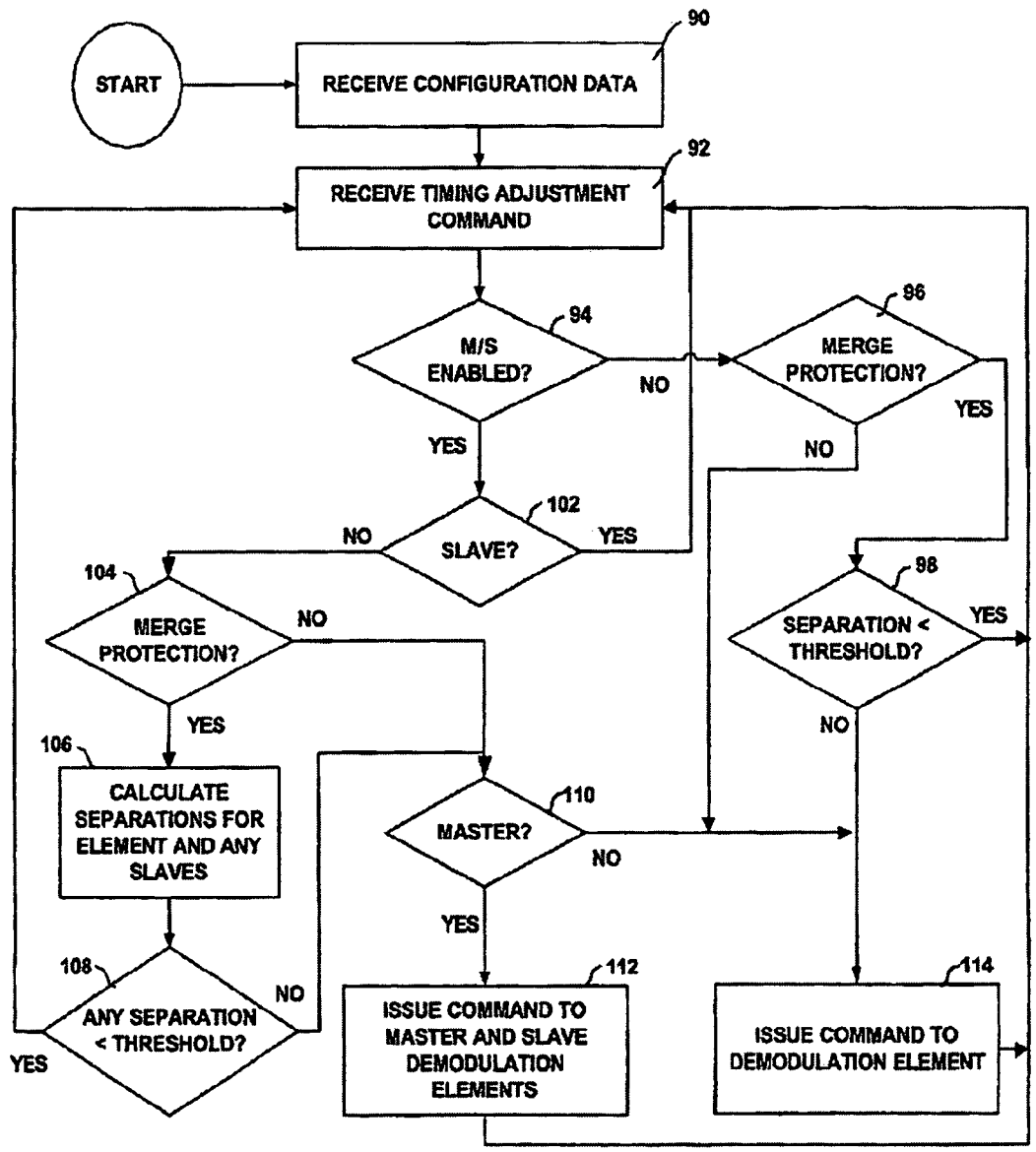
FIG. 6 is a flow chart illustrating an exemplary operation of a subscriber unit that combines the merge protection time-tracking features and the master/slave time-tracking features.

FIG. 6 is a flow chart illustrating high-level operation of one embodiment of cluster controller 36 that supports both merge protection and M/S time-tracking. Initially, cluster controller 36 receives configuration information for both features including MP_EN input 35, MPT 33, PN_COUNTS 31, M/S_DATA 37 and M/S_EN input 39 (90). After configuration, cluster controller 36 continuously intercepts each timing command 42 issued by time-tracking module 38 (92).

After receiving timing command 42, cluster controller 36 determines whether master/slave (M/S) timing is enabled (94). If M/S timing is not enabled, cluster controller 36 determines whether merge protection is enabled for the demodulation element to which the command was directed (96).

If merge protection is not enabled (no branch of 96) for the demodulation element targeted by timing command 42, cluster controller 36 forwards the command to the targeted demodulation element (114). If merge protection is enabled, cluster controller 36 determines whether application of the timing command would cause a decrease in time separation between the targeted demodulation element and any other demodulation elements assigned to the same base station, and would yield a resultant time separation of less than a defined threshold (MPT) from any other demodulation elements assigned to the same base station (98). If not, cluster controller 36 forwards the command to the targeted demodulation element (114). If so, cluster controller 36 filters the command and, specifically, does not issue the timing command to the targeted demodulation element.

If M/S timing is enabled (yes branch of 94), cluster controller 36 examines M/S_DATA to determine whether the target demodulation element for timing command 42 is currently configured as a slave device (102). If so, cluster controller 36 filters the command and, specifically, does not issue the timing command to the targeted demodulation element.

If the targeted demodulation element is not currently designated as a slave (no branch of 102), cluster controller 36 determines whether merge protection is enabled for the demodulation element to which the command was directed (104). If merge protection is enabled, cluster controller 36 determines whether application of the timing command would cause a decrease in time separation between the targeted demodulation element or any of its slaves (106) and any other demodulation elements assigned to the same base station, and would yield a resultant time separation of less than MPT (108). If so, cluster controller 36 filters the command and, specifically, does not issue the timing command to the targeted demodulation element.

If no such time separation would drop below MPT (no branch of 108), or if merge protection was not enabled for the target modulation device (no branch of 104), cluster controller 36 determines whether the demodulation element is designated as a master (110). If so, cluster controller 36 simultaneously forwards the time tracking command to the targeted demodulation element and all corresponding slave demodulation elements, thereby maintaining substantially constant time separations between the master demodulation element and the slave demodulation elements (112). If not, cluster controller 36 forwards the command to the targeted demodulation element (114). Cluster controller 36 repeats the process for subsequent commands 42 issued by time-tracking module 38.

These time-tracking features may be used in conjunction with techniques for assigning the demodulation elements to paths based on the number of demodulation elements clustered around one or more multipath signals. In particular, subscriber unit 4 may make use of one or more "virtual" paths to improve performance in unresolvable multipath environments by assigning free demodulation elements in close proximity in time to other elements. A "virtual" path, as used herein, refers to a path that is added to the list of candidate paths for assignment to a demodulation element even though a corresponding peak was not necessarily detected within the received spread spectrum signal. Subscriber unit 4 may selectively add one or more virtual paths having a time offset substantially near an assigned demodulation element, such as two or less chips away from the demodulation element in time.

In this manner, if a free demodulation element exists, subscriber unit 4 may assign the demodulation element to the virtual path. Consequently, by considering virtual paths for tracking and demodulation, subscriber unit 4 may more efficiently assign demodulation elements to improve performance in short multipath environments. The demodulation elements assigned to virtual paths can instantly demodulate the various paths in the event an unresolvable multipath situation exists. The demodulation elements may also instantly track the multiple paths if the paths diverge to have greater time separations, thereby eliminating latency inherent in reassigning demodulation elements. These techniques are described below and in commonly assigned co-pending U.S. application Ser. No. 09/968,344, entitled "ASSIGNING DEMODULATION ELEMENTS IN A SPREAD SPECTRUM SYSTEM" filed the same day as this application, which is incorporated herein by reference in its entirety.

In some embodiment, virtual paths may be used in conjunction with mechanisms for detecting short multipath environments. Specifically, the decision to add virtual paths to the path list might be contingent on detecting a short multipath. This may be accomplished according to a variety of techniques. Controller 22 may, for example, determine the variance over time of the time offset for a detected peak. Alternatively, search module 18 may estimate a width of the peak.

Figure 7:
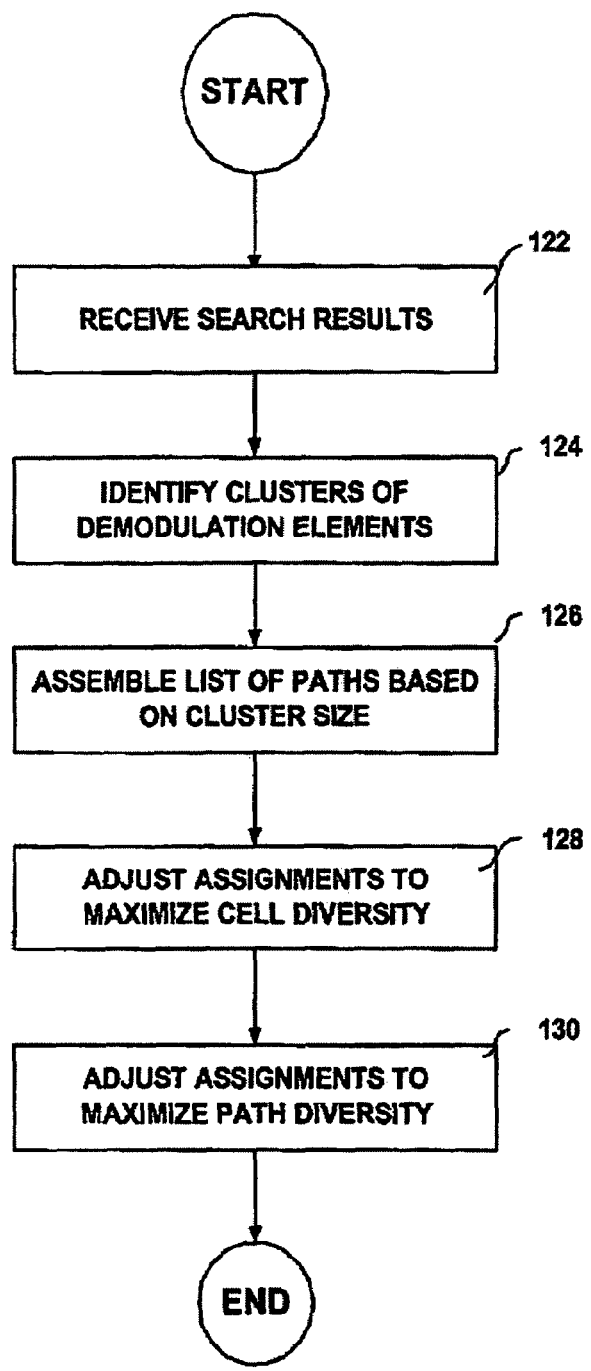
FIG. 7 is a flow chart providing a high-level overview of the operation of the subscriber unit when assigning the demodulation elements.

FIG. 7 is a flow chart providing a high-level overview of the operation of subscriber unit 4 when assigning demodulation elements 30 to track and demodulate the various paths. Initially, controller 22 receives search results 20 from search module 18 that identify a list of possible paths to which demodulation elements 30 could be assigned (122). The search results 20 may, for example, take the form of an integer list of peak energy levels and corresponding time offsets.

Next, controller 22 examines path information for each demodulation element 30 to identify clusters of demodulation elements (124). Controller 22 may, for example, read a current time offset and a signal strength indicator from each demodulation element 30. Alternatively, the information may be maintained by controller 22 in a computer-readable medium.

Based on the information, controller 22 identifies clusters in which each demodulation element 30 of a given cluster is within a Finger Association Threshold (FT) of at least another demodulation element 30 of the cluster, and in which no demodulation element 30 is within FT of a demodulation element 30 of a different cluster. With an appropriate FT, controller 22 forms clusters in which the demodulation elements of the cluster are likely tracking the same path or the same group of paths. An appropriate FT in some embodiments may be on the order of ⅞ths of a chip time.

Based on the number of demodulation elements within the identified clusters, controller 22 merges the search results from search module 18 with the path information of the demodulation elements to create an aggregate list of paths (126). In particular, as described in reference to FIGS. 8-11, controller 22 may add one or more virtual paths to the list, and insert, prioritize or otherwise modify the current assignment of the demodulation elements 30 based on cluster size. In general, these techniques allow subscriber unit 4 to more quickly track short multipath signals, and otherwise make use of demodulation elements that may go unassigned. In this manner, subscriber unit 4 achieves increased performance in short multipath environments.

After generating the aggregate list of candidate paths and manipulating assigned demodulation elements according to identified clusters, controller 22 may further process the list to maximize cell diversity by scanning the list and ensuring that at least one demodulation element 30 is assigned to every detected base station 6 (128). Controller 22 may then maximize path diversity by ensuring that demodulation elements 30 are assigned to multipath transmission from a common base station according to a signal strength of each path (130).

Figure 8:
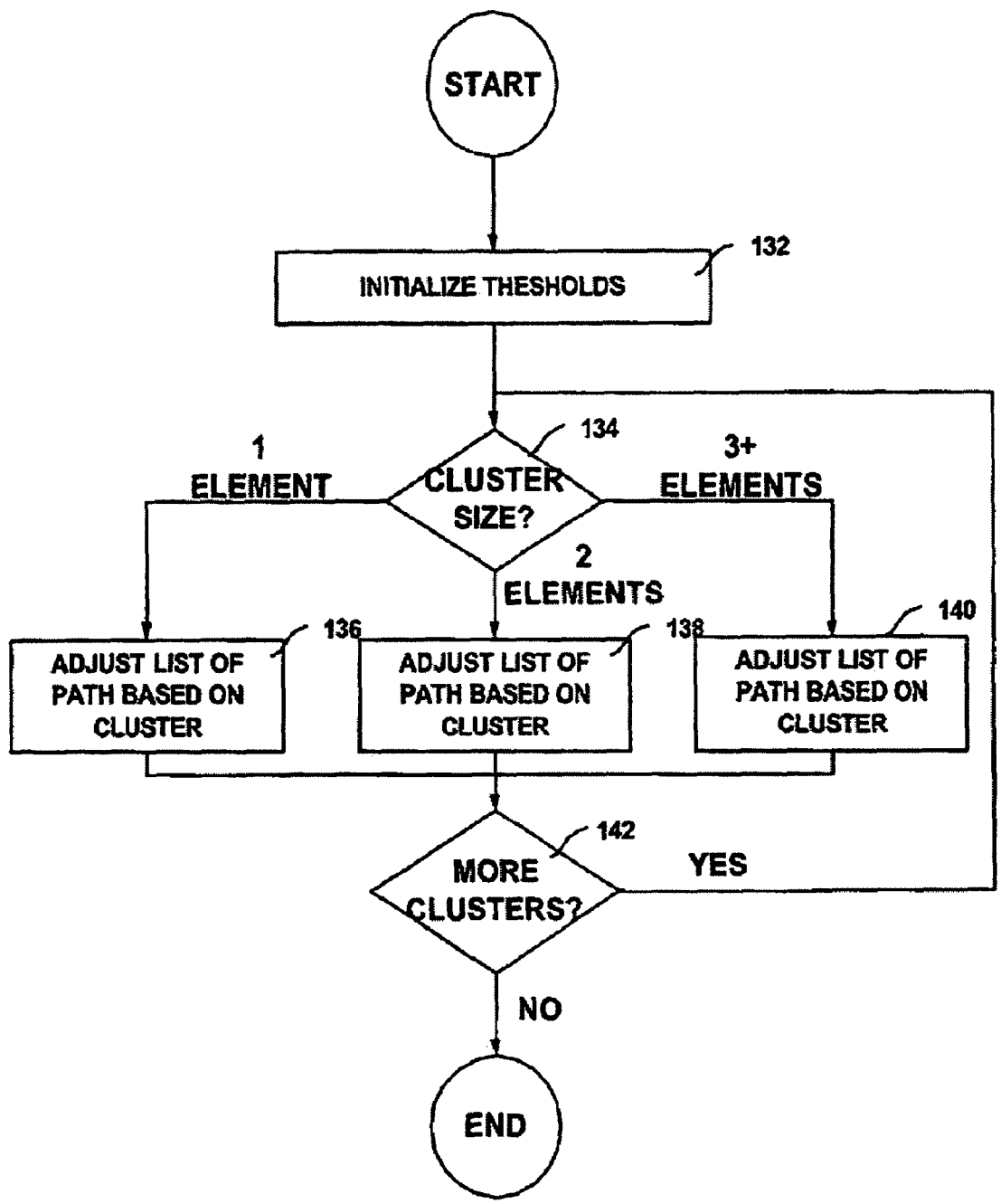
FIG. 8 is a flow chart illustrating an exemplary operation of the subscriber unit when merging search results with current path information for the demodulation elements.

FIG. 8 is a flow chart illustrating in detail an exemplary operation of controller 22 when merging the search results 20 with the current path information of the demodulation elements 30 (block 126 of FIG. 7). First, controller 22 initializes a number of configurable thresholds that control the addition of virtual paths and the assignment of demodulation elements 30 (132). Specifically, controller 22 initializes a Searcher Peak Association Threshold (ST), and an Assignment Delay (AD). The Searcher Peak Association Threshold (ST) is a threshold for controlling the association of a peak result received from search module 18 with a demodulation element 30. The Assignment Delay (AD) is a time delay used for placing virtual paths from their associated demodulation elements or searcher peaks. The AD is also used as a window for locating real searcher peaks or other demodulation elements to determine whether a virtual path should be inserted into the path list. All of these thresholds may be expressed in chip time, such as fractions of a chip. Table 1 illustrates exemplary settings for the thresholds.

TABLE 1

| THRESHOLD | VALUE (CHIPS) |
| --- | --- |
| ST | 6/8 |
| AD | 9/8 |

Next, controller 22 examines the first cluster of demodulation elements, and determines the number of demodulation elements within the cluster (134). Specifically, in this example, controller 22 assembles the path list differently depending on the number of demodulation elements in the cluster. Consequently, controller 22 separately processes clusters having a single demodulation element (136), two demodulation elements (138), or three or more demodulation elements (140). After processing the cluster, controller 22 determines whether more clusters exist (142) and repeats the process until all clusters have been processed.

Figure 9:
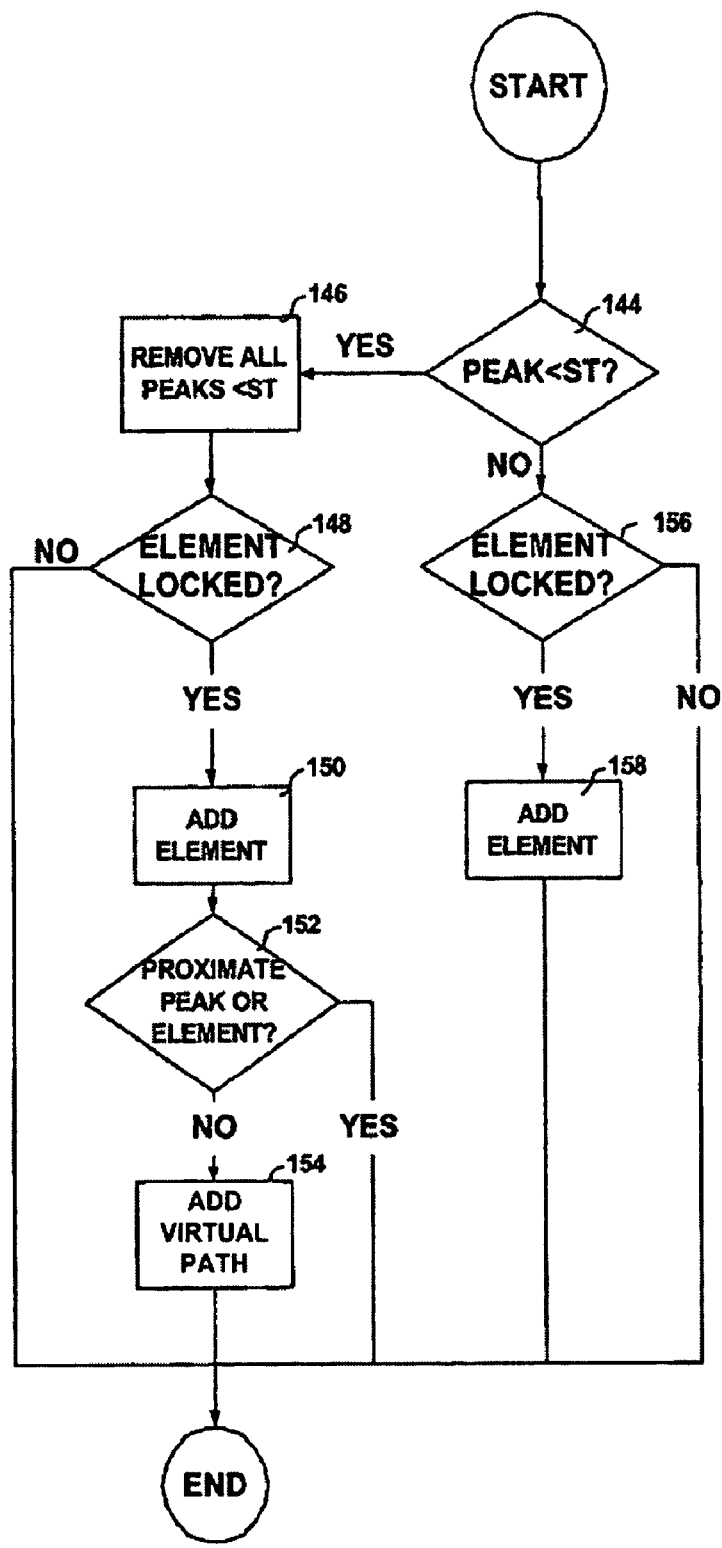
FIG. 9 is a flowchart illustrating an example mode of operation in which the subscriber unit processes a cluster having a single demodulation element.

FIG. 9 is a flowchart illustrating an example mode of operation in which controller 22 processes a cluster having a single demodulation element. First, controller 22 determines whether a peak exists within the path list that is less than an ST chip away from the demodulation element of the cluster (144). If there is at least one peak near the demodulation element, then controller 22 removes the corresponding paths from the path list (146). Next, controller 22 determines whether the demodulation element is "locked," i.e., whether the demodulation element is currently assigned to a path having a signal strength greater than a defined threshold (148). If not, controller 22 terminates the adjustment without adding any paths to the path list. If so, controller adds a path to the list having the time offset and the signal strength of the current demodulation element and marks the path as assigned to the single demodulation element (150). Next, controller 22 determines whether any other elements or peaks are outside the cluster, but within 2*AD chips of the single demodulation element (152). If not, controller 22 can safely insert a virtual path into the path list as a candidate for short multipath tracking (154). In particular, controller 22 sets a time offset of the virtual path to have a separation of AD chips from the previously inserted demodulation element, and biases the signal strength of the virtual path to 9 dB less than the strength of the previously inserted demodulation element. If, however, another proximate element or peak is identified, controller 22 does not add the virtual path because the additional path may be too close to a neighboring cluster, and may cause demodulation elements to track together.

When no peaks are detected within an ST chip from the single demodulation element of the cluster (no branch of 144), controller 22 determines whether the demodulation element is locked (156) and, if so, adds a path to the path list for the single demodulation element (158) without adding a virtual path. If the demodulation element is not locked, then controller 22 terminates the adjustment process without adding the demodulation element or a virtual path to the path list.

Figure 10:
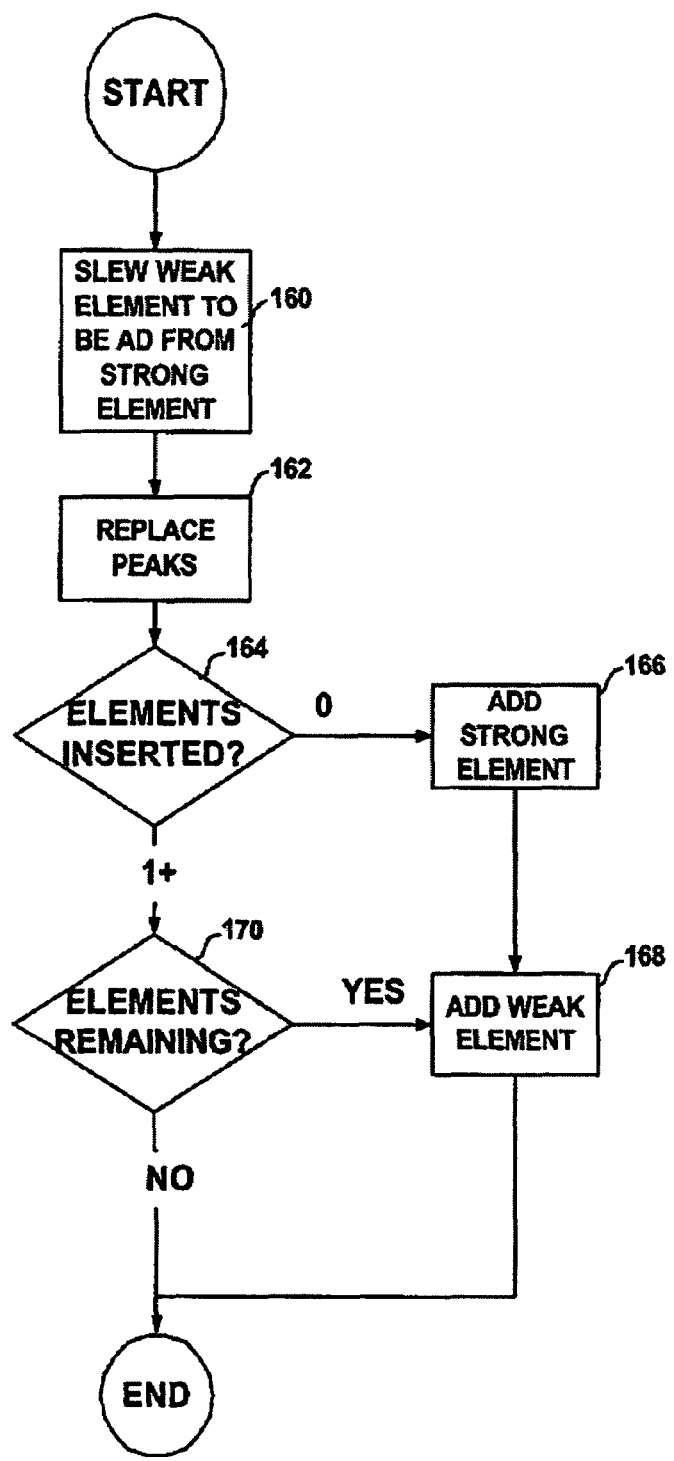
FIG. 10 is a flowchart illustrating an example mode of operation in which controller processes a cluster having two demodulation elements.

FIG. 10 is a flowchart illustrating an example mode of operation in which controller 22 processes a cluster having two demodulation elements. For clusters having two demodulation elements, controller 22 slews the weaker demodulation element away from the stronger demodulation element (160). In this manner, controller 22 leaves both elements assigned and represented in the path list, but avoids degradation of the signal to noise ratio at the output of the symbol combiner 34 in short multipath environments. In particular, controller 22 examines the signal strength of the two demodulation elements of the cluster. Controller 22 then adjusts the timing of the demodulation element having the weaker signal strength so that it is AD chips from the stronger demodulation element by slewing it away from the stronger. In this manner controller 22 restores the original separation between the two demodulation elements assigned to the real and the virtual paths.

Next, controller 22 replaces peaks within ST chips of either of the two demodulation elements (162). For a first peak within ST chips of either of the two demodulation elements, controller 22 removes the peak from the path list and inserts the information for the strongest of the subset of demodulation elements within ST chips of the peak. For a second peak or third peak, if one or both exist, within ST chips of either of the two demodulation elements, controller 22 removes the peak(s) from the path list and identifies the strongest of the subset of demodulation elements within ST chips of the peak. If the information for the identified demodulation element has not been previously inserted into the path list, then the controller 22 inserts the information for the identified demodulation element according to its time offset and signal strength.

If no peaks were replaced (no branch 164), controller 22 first inserts the strongest demodulation element into the path list according to its time offset and signal strength (166). Controller 22 then inserts the second demodulation element to the path list as a virtual path having a distance of AD chips from the stronger demodulation element, and with a signal strength of 9 dB less than the strength of the stronger element (168). By setting the signal strength as such, controller 22 prioritizes the demodulation elements to ensure that the weaker element is selected in the event one of the elements needs to be reassigned.

If, however, peaks were replaced ([yes] 1+branch of 164), controller 22 determines whether any of the two demodulation elements of the cluster remain to be added to the path list, i.e., whether the weaker demodulation element was added (170). If so, controller 22 adds the weaker of the demodulation elements to the path list at a distance of AD chips from the stronger demodulation element, and with a signal strength of 9 dB less than the strength of the stronger element, as described above (168). In this manner, controller 22 ensures that the two positions in the path list for the cluster correspond to the two demodulation elements, and that the spacing of the elements is set to track independent signals in short multipath environments.

Figure 11:
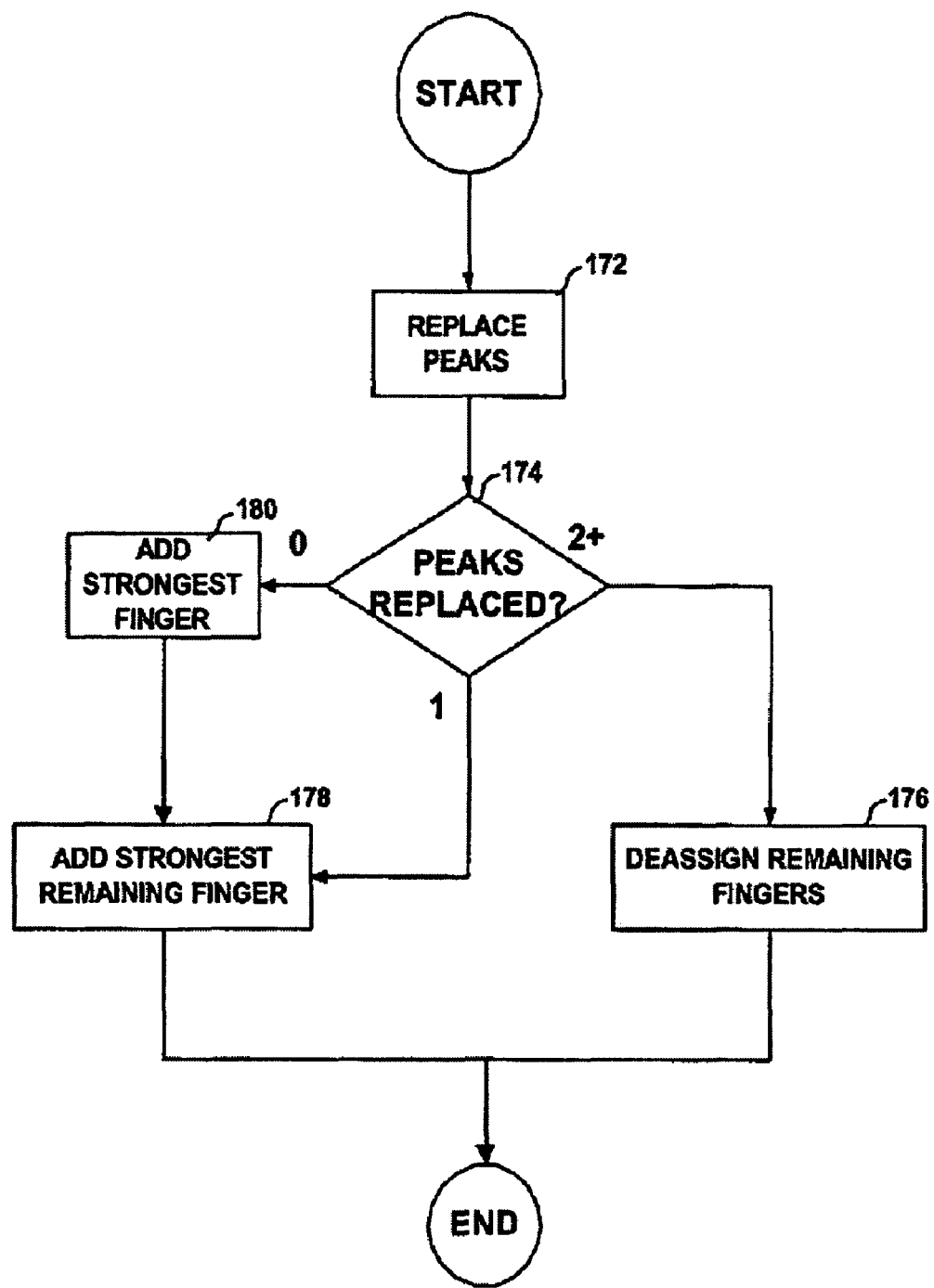
FIG. 11 is a flowchart illustrating an example mode of operation in which controller processes a cluster having three or more demodulation elements.

FIG. 11 is a flowchart illustrating an example mode of operation in which controller 22 processes a cluster having three or more demodulation elements. Generally, for clusters having three or more demodulation elements, controller 22 seeks to deassign one or more of the demodulation elements to reduce the cluster to two or fewer elements, but also to give preference to resolvable peaks identified by search module 18. Similar to clusters having two elements, controller 22 replaces peaks of the path list that are within ST chips of any demodulation elements (172). For a first peak within ST chips of at least one of the demodulation elements, controller 22 removes the peak from the path list and inserts the information for the strongest of the subset of demodulation elements within ST chips of the peak. For additional peaks, if they exist, within ST chips of any of the demodulation elements within the cluster, controller 22 removes the peak from the path list and identifies the strongest of the subset of demodulation elements within ST chips of the peak. If the information for the identified demodulation element has not been previously inserted into the path list, then the controller 22 inserts the information for the identified demodulation element.

Next, controller 22 adds demodulation elements to the path list as virtual paths based on the number of replaced peaks. First, controller 22 determines the number of demodulation elements inserted in place of peaks (174). If two or more demodulation elements were inserted in the path list in replacement of the peaks, controller 22 deassigns the remaining demodulation elements of the cluster (176). If a single demodulation element was inserted, then controller 22 inserts the strongest of the remaining demodulation elements into the path list (178). Controller 22 sets the signal strength to 9 dB less than the maximum strength of all of the demodulation elements of the set. If no demodulation elements were inserted in place of paths, controller 22 first inserts the strongest demodulation element of the cluster into the path list according to its timing information and signal strength (180). Controller 22 then inserts the strongest of the remaining demodulation elements into the path list as a virtual path with a signal strength of 9 dB less than the strength of the strongest element (178).

Figure 12A:
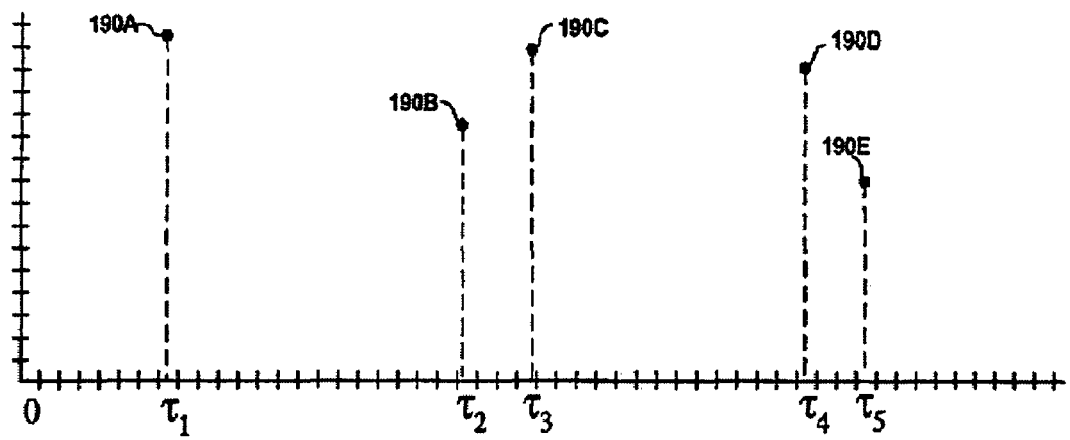
FIG. 12A is a graph illustrating exemplary search results.
Figure 12B:
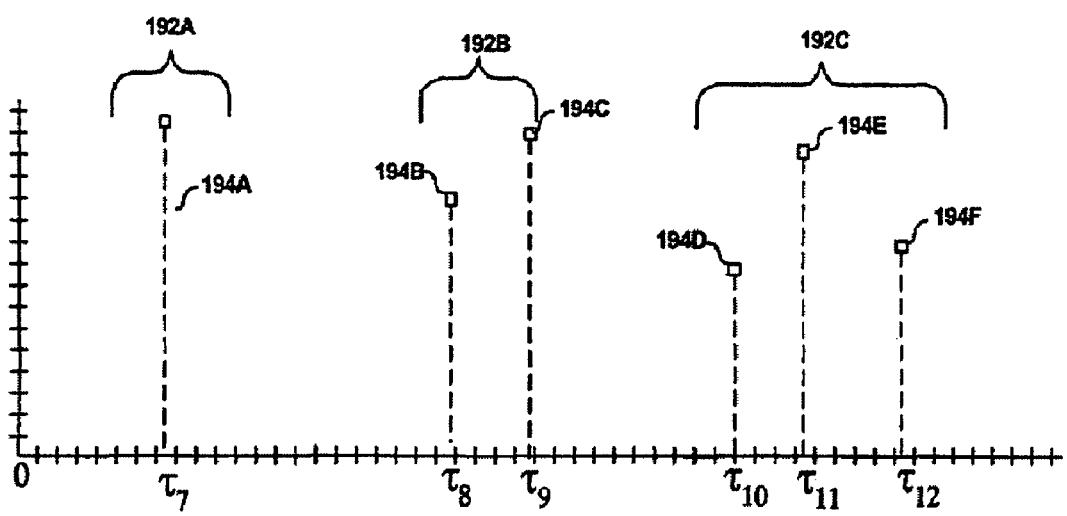
FIG. 12B is a graph illustrating an exemplary assignment of six demodulation elements.
Figure 12C:
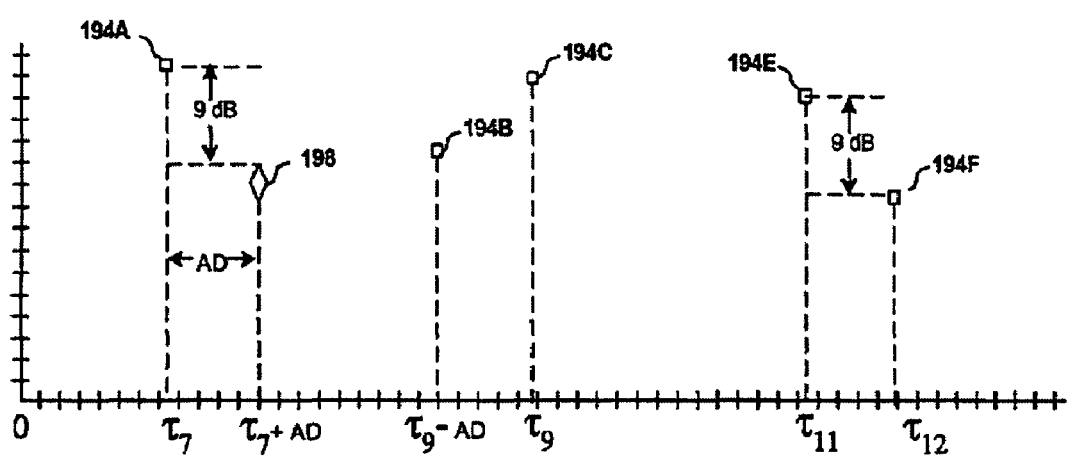
FIG. 12C is a graph illustrating a resultant path list when the search results of FIG. 12A are merged with the demodulation elements of FIG. 12B according to the principles of the invention.

FIGS. 12A-12C are graphs illustrating an exemplary process of merging search results from search module 18 with the current path information of the demodulation elements. Specifically, FIG. 12A is a graph illustrating exemplary search results from search module 18 that include a plurality of paths 190A-190E. Each path 190 has a corresponding time offset ($\tau_1$-$\tau_5$) plotted along the horizontal axis, and a corresponding signal strength plotted along the vertical axis. FIG. 12B is a graph illustrating an exemplary assignment of six demodulation elements 194A-194F. Similar to paths 190 of FIG. 12A, each demodulation element 194 has a corresponding time offset ($\tau_7$-$\tau_{12}$) and a corresponding signal strength. Based on the time offsets for demodulation elements 194, controller 22 groups demodulation elements 194 into three clusters 192A-192C assuming:

$$\tau_2-\tau_1>FT, \tau_3-\tau_2<=FT, \tau_4-\tau_3>FT, \tau_5-\tau_4<=FT.$$

FIG. 12C is a graph illustrating a resultant path list when controller 22 merges search results 190 and demodulation elements 194 according to the principles of the invention. In particular, for cluster 192A, controller 22 replaces path 190A with a time offset and a signal strength for demodulation element 194A. In addition, controller 22 inserts virtual path 198 as a candidate for a demodulation element even though no corresponding peak was detected. Controller inserts virtual path 198 to have a time separation of AD chips from demodulation element 194A, and a signal strength of 9 dB less than the signal strength of demodulation element 194A.

Cluster 192B includes two demodulation elements 194B and 194C, that each have corresponding peaks 190B and 190C, respectively, within the search results. Consequently, controller 22 replaces peaks 190B and 190C in the path list with demodulation elements 194B and 194C, but slews demodulation element 194B to be AD chips away from demodulation element 194C. This assumes that: $|\tau_8-\tau_2|<ST$, $|\tau_9-\tau_3|<ST$, and $|\tau_9-\tau_2|>=ST$.

Cluster 192C includes three demodulation elements 194D, 194E and 194F. Assuming that $|\tau_{11}-\tau_4|<ST$ and $|\tau_{11}-\tau_5|<ST$, controller 22 replaces peaks 190D and 190E in the path list with demodulation element 194E. Since only one demodulation element was added in replacement of the paths, controller adds the stronger of the remaining demodulation elements of cluster 192C, i.e., demodulation element 194F as a virtual path. Controller 22 inserts demodulation element 194F to have a signal strength of 9 dB less than the signal strength of demodulation element 194E. Controller 22 deassigns demodulation element 194D. In this manner, controller 22 reduces the number of demodulation elements of cluster 192C from three elements to two. Consequently, demodulation element 194D that has been deassigned, may likely be assigned to virtual path 198, thereby improving performance in short multipath environments.

Various embodiments of the invention have been described. For example, a subscriber unit for use in a spread spectrum communication system has been described that employs a number of techniques for controlling time-tracking of clustered demodulation elements in a multipath environment. In particular, a subscriber unit has been described that includes merge protection and master/slave time-tracking features. The merge protection feature prevents elements tracking paths from the same base station from converging to less than a threshold time separation, thereby allowing the elements to adaptively adjust and maintain the time span so as to contain substantially all of the energy of the received spread spectrum signal. The master/slave (M/S) feature synchronizes time-tracking adjustments to slave demodulation elements with time-tracking adjustments to a master demodulation element. In this manner, the clustered demodulation elements can surround and track an unresolvable multipath in unison.

These features may be selectively enabled for independent use, or may be used in conjunction to further improve performance. Consequently, the subscriber unit can achieve significant improvements in unresolvable multipath environments, including improved signal to noise ratio, power control and capacity. Although as described in reference to a subscriber units, the techniques may readily be applied to other components of a spread spectrum communication system, including a base station operating in receive mode. These and other embodiments are within the scope of the following claims.

The invention claimed is:

1. A wireless communication device comprising:
  a searcher that generates a list of paths associated with received signals, each path in the list of paths identified by a corresponding time offset and corresponding signal strength;
  a plurality of demodulation elements, each of the plurality of demodulation elements having a corresponding time offset and corresponding signal strength; and
  a controller that adds a virtual path to the list of paths based on a comparison of the time offsets and the signal strengths of the plurality of demodulation elements with the time offsets and the signal strengths of the list of paths,
  wherein the virtual path is associated with a corresponding time offset and signal strength, which do not equal the time offset and signal strength of any one of the plurality of demodulation elements.

2. The device of claim 1, wherein the virtual path is associated with a corresponding time offset and signal strength, which does not correspond to signal peaks detected from received signals.

3. The device of claim 1, wherein the controller identifies a cluster of demodulation elements based a comparison of the corresponding time offsets of the plurality of demodulation units relative to a finger association threshold.

4. A wireless communication device comprising:
  a searcher that generates a list of paths associated with received signals, each path in the list of paths identified by a corresponding time offset and corresponding signal strength;

a plurality of demodulation elements, each of the plurality of demodulation elements having a corresponding time offset and corresponding signal strength; and a controller that adds a virtual path to the list of paths based on a comparison of the time offsets and the signal strengths of the plurality of demodulation elements with the time offsets and the signal strengths of the list of paths, wherein the controller replaces a first path from the list of paths with a replacement path having a first time offset and a first signal strength associated with a first demodulation element based on a comparison of the first path and the first demodulation element, and wherein the controller places the virtual path at a second time period and a second signal strength relative to the replacement path.

5. A wireless communication device comprising:

a searcher that generates a list of paths associated with received signals, each path in the list of paths identified by a corresponding time offset and corresponding signal strength;

a plurality of demodulation elements, each of the plurality of demodulation elements having a corresponding time offset and corresponding signal strength; and a controller that adds a virtual path to the list of paths based on a comparison of the time offsets and the signal strengths of the plurality of demodulation elements with the time offsets and the signal strengths of the list of paths, wherein the controller adds the virtual path if not more than one path from the list of paths is within a determined time period from a cluster of demodulations elements selected from the plurality of demodulation elements.

6. The device of claim 5, wherein the cluster of demodulation elements comprises a single demodulation element.

7. A method implemented in an apparatus for managing a plurality of demodulation units in a wireless communication device, the wireless communication device including a plurality of demodulation elements, each of the plurality of demodulation elements having a corresponding time offset and corresponding signal strength, the method comprising:

generating a list of paths associated with received signals, each path in the list of paths identified by a corresponding time offset and corresponding signal strength;

comparing the time offsets and the signal strengths of the plurality of demodulation elements with the time offsets and the signal strengths of the list of paths; and adding a virtual path to the list of paths based on the comparison, wherein the virtual path is associated with a corresponding time offset and signal strength, which do not equal the time offset and signal strength of any one of the plurality of demodulation elements.

8. The method of claim 7, wherein the virtual path is associated with a corresponding time offset and signal strength, which does not correspond to signal peaks detected from received signals.

9. The method of claim 7, further comprising:

replacing a first path from the list of paths with a replacement path having a first time offset and a first signal strength associated with a first demodulation element based on a comparison of the first path and the first demodulation element;

placing the virtual path at a second time period and a second signal strength relative to the replacement path.

10. The method of claim 7, further comprising identifying a cluster of demodulation elements based a comparison of the corresponding time offsets of the plurality of demodulation units relative to a finger association threshold.

11. The method of claim 7, wherein the virtual path is added if not more than one path from the list of paths is within a determined time period from a cluster of demodulations elements selected from the plurality of demodulation elements.

12. The method of claim 11, wherein the cluster of demodulation elements comprises a single demodulation element.

13. A wireless communication device comprising:

a plurality of demodulation elements, each of the plurality of demodulation elements having a corresponding time offset and corresponding signal strength;

means for generating a list of paths associated with received signals, each path in the list of paths identified by a corresponding time offset and corresponding signal strength;

means for comparing the time offsets and the signal strengths of the plurality of demodulation elements with the time offsets and the signal strengths of the list of paths; and means for adding a virtual path to the list of paths based on the comparison, wherein the virtual path is associated with a corresponding time offset and signal strength, which do not equal the time offset and signal strength of any one of the plurality of demodulation elements.

14. The device of claim 13, wherein the virtual path is associated with a corresponding time offset and signal strength, which does not correspond to signal peaks detected from received signals.

15. The device of claim 13, further comprising means for identifying a cluster of demodulation elements based a comparison of the corresponding time offsets of the plurality of demodulation units relative to a finger association threshold.

16. A wireless communication device comprising:

a plurality of demodulation elements, each of the plurality of demodulation elements having a corresponding time offset and corresponding signal strength;

means for generating a list of paths associated with received signals, each path in the list of paths identified by a corresponding time offset and corresponding signal strength;

means for comparing the time offsets and the signal strengths of the plurality of demodulation elements with the time offsets and the signal strengths of the list of paths;

means for adding a virtual path to the list of paths based on the comparison;

means for replacing a first path from the list of paths with a replacement path having a first time offset and a first signal strength associated with a first demodulation element based on a comparison of the first path and the first demodulation element; and means for placing the virtual path at a second time period and a second signal strength relative to the replacement path.

17. A wireless communication device comprising:

a plurality of demodulation elements, each of the plurality of demodulation elements having a corresponding time offset and corresponding signal strength;

means for generating a list of paths associated with received signals, each path in the list of paths identified by a corresponding time offset and corresponding signal strength; and means for comparing the time offsets and the signal strengths of the plurality of demodulation elements with the time offsets and the signal strengths of the list of paths, wherein the virtual path is added if not more than one path from the list of paths is within a determined time period from a cluster of demodulations elements selected from the plurality of demodulation elements.

18. The device of claim 17, wherein the cluster of demodulation elements comprises a single demodulation element.

19. A computer program product, comprising:

computer-readable medium for managing a plurality of demodulation units in a wireless communication device, the wireless communication device including a plurality of demodulation elements, each of the plurality of demodulation elements having a corresponding time offset and corresponding signal strength, the computer-readable medium comprising:

code for causing a computer to generate a list of paths associated with received signals, each path in the list of paths identified by a corresponding time offset and corresponding signal strength;

code for causing a computer to compare the time offsets and the signal strengths of the plurality of demodulation elements with the time offsets and the signal strengths of the list of paths; and code for causing a computer to add a virtual path to the list of paths based on the comparison, wherein the virtual path is associated with a corresponding time offset and signal strength, which do not equal the time offset and signal strength of any one of the plurality of demodulation elements.

* * * * *